(12) United States Patent
Evans

(10) Patent No.: US 9,368,867 B2
(45) Date of Patent: Jun. 14, 2016

(54) NEAR-LINEAR DRIVE SYSTEMS FOR POSITIONING REFLECTORS

(71) Applicant: HARRIS CORPORATION, Melbourne, FL (US)

(72) Inventor: Mark Evans, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 135 days.

(21) Appl. No.: 14/047,611

(22) Filed: Oct. 7, 2013

(65) Prior Publication Data

US 2015/0097743 A1    Apr. 9, 2015

(51) Int. Cl.
| | |
|---|---|
| H01Q 3/00 | (2006.01) |
| H01Q 3/20 | (2006.01) |
| H01Q 3/14 | (2006.01) |
| F16H 21/40 | (2006.01) |
| F16H 25/20 | (2006.01) |
| G02B 7/182 | (2006.01) |
| H01Q 1/12 | (2006.01) |

(52) U.S. Cl.
CPC ............... *H01Q 3/20* (2013.01); *F16H 21/40* (2013.01); *F16H 25/20* (2013.01); *G02B 7/1821* (2013.01); *H01Q 1/125* (2013.01); *H01Q 3/14* (2013.01); *Y10T 74/18184* (2015.01)

(58) Field of Classification Search
CPC ........... H01Q 3/20; H01Q 3/14; H01Q 1/125; F16H 21/40; F16H 25/20; G02B 7/1821
See application file for complete search history.

(56) References Cited

U.S. PATENT DOCUMENTS

| | | | |
|---|---|---|---|
| 1,344,289 A | 6/1920 | Case | |
| 1,692,466 A | 11/1928 | Pflueger et al. | |
| 1,841,234 A | 1/1932 | Thorpe | |
| 2,407,310 A | 9/1946 | Lundy | |
| 2,537,822 A | 1/1951 | Fritts | |
| 2,557,967 A | 6/1951 | Hudson et al. | |

(Continued)

FOREIGN PATENT DOCUMENTS

EP    2549585    1/2013

OTHER PUBLICATIONS

Information about Related Patents and Patent Applications, see section 6 of the accompanying Information Disclosure Statement Letter, which concerns Related Patents and Patent Applications. Dec. 3, 2013.

(Continued)

*Primary Examiner* — Trinh Dinh
(74) *Attorney, Agent, or Firm* — Fox Rothschild LLP; Robert J. Sacco; Carol E. Thorstad-Forsyth

(57) ABSTRACT

System for positioning a reflector includes a base (112), yoke (104) and a reflector in the form of a lens mirror assembly (10). A motor (120) is mounted and remains substantially stationary with respect to rotation about a first axis while the yoke rotates about the first axis. A connecting rod (152) actuated for movement by the motor is mechanically coupled to the reflector so that movement of the connecting rod in relation to the yoke imparts rotation to the reflector about the second axis when the reflector is supported by the yoke. A mechanical drive system couples an output shaft of the motor to the connecting rod. The mechanical drive system is arranged so that it varies an angular position of the reflector at a rate which is linearly related to the rotation of the output shaft.

9 Claims, 10 Drawing Sheets

(56) References Cited

U.S. PATENT DOCUMENTS

| | | | |
|---|---|---|---|
| 2,599,381 A | 6/1952 | Gerks | |
| 2,916,739 A | 12/1959 | Falstrom | |
| 3,980,252 A | 9/1976 | Tae | |
| 4,772,410 A | 9/1988 | Sato | |
| 5,945,961 A * | 8/1999 | Price | H01Q 1/125 343/757 |
| 6,188,300 B1 | 2/2001 | Rodeffer | |
| 6,911,950 B2 | 6/2005 | Harron | |
| 7,388,700 B1 * | 6/2008 | Odhner | G02B 7/1821 359/224.1 |
| 7,463,206 B1 | 12/2008 | Kyhle | |
| 7,839,348 B2 * | 11/2010 | Baker | H01Q 1/125 343/711 |
| 9,054,409 B2 * | 6/2015 | Zimmerman | H01Q 3/08 |
| 2003/0112194 A1 | 6/2003 | Watson | |
| 2007/0052604 A1 * | 3/2007 | Young | G01S 3/42 343/757 |
| 2009/0158878 A1 | 6/2009 | Clayton et al. | |
| 2012/0268333 A1 * | 10/2012 | Lucidarme | H01P 1/161 343/763 |
| 2013/0021214 A1 * | 1/2013 | Zimmerman | H01Q 3/08 343/761 |

OTHER PUBLICATIONS

European Search Report mailed Nov. 15, 2012; Application Serial No. 12005036.4-2220 in the name of Harris Corporation.

International Search Report and Written Opinion mailed Oct. 31, 2014 in Application PCT/US2014/049397.

* cited by examiner

NEAR-LINEAR DRIVE SYSTEMS FOR POSITIONING REFLECTORS

BACKGROUND OF THE INVENTION

1. Statement of the Technical Field

The inventive arrangements relate to systems for positioning or pointing reflectors on a dynamic or moving basis, and more particularly to reflector assemblies that are used to focus and direct energy to and from sensors used in applications such as satellite communications and optical sensing.

2. Description of the Related Art

Directive sensors, i.e., sensors whose functionality is dependent upon the relative orientation thereof, are often used in applications that require hemispherical pointing and focusing of the energy being directed to or from the sensor, hereinafter referred to as "the sensor beam." A passive reflector in the form of a lens and an attached mirror, hereinafter referred to collectively as a lens/mirror assembly, can be used to focus and direct the sensor beam. To effectuate hemispherical pointing of the sensor beam, the lens/mirror assembly needs to be movable so that its azimuth angle, i.e., compass direction, and elevation angle, i.e., the angle above the horizon, can be varied. Hemispherical pointing thus requires that the lens/mirror assembly rotate about at least two axes.

Lens/mirror assemblies, and other types of reflectors that require hemispherical pointing can be mounted on devices that facilitate movement of the lens/mirror assembly about a vertically-oriented axis and a horizontally-oriented axis. For example, the lens/mirror assembly can be suspended from a yoke or other type of mount that permits the lens/mirror assembly to pivot about the horizontally-oriented axis. The yoke, in turn, can be mounted on a base or other component that permits the yoke and the lens/mirror assembly, hereinafter referred to collectively as a yoke assembly, to rotate about the vertically-oriented axis.

Components such as electric motors can be used to impart motion to rotate the yoke assembly about the vertical axis and the lens/mirror assembly about the horizontal axis. The azimuth motor, i.e., the motor that causes the yoke assembly to rotate about the vertical axis, can be mounted below the base or turntable of the hemispherical pointing device, on the non-rotating portion of the device. The elevation motor, i.e., the motor that causes the lens/mirror assembly to pivot about the horizontal axis, is typically mounted on the rotating yoke. Power for the motor can be supplied by electric cabling. The use of cabling, however, can prevent the yoke assembly from being able to rotate continuously about the vertical axis. In practice, it may be necessary to reverse the direction of rotation of the yoke assembly after these components have rotated through a net angular displacement of approximately 200°, to avoid stretching and potentially damaging the cabling. The need to reverse the direction of rotation in this manner can add to the time needed for the system to respond to required changes in the azimuth angle, and can reduce the duty cycle of the motor and other components of the system that effectuate rotation of the yoke assembly.

Brush-type electrical slip rings can be used to transfer electrical power between the rotating and non-rotating components of a hemispherical pointing device, thereby eliminating the need for cabling to transfer power. Although slip rings can thereby facilitate continuous rotation of the yoke and the lens/mirror assembly about their vertical axes, slip rings typically wear and require replacement at relatively frequent intervals due to the friction inherent in the operation thereof. Slip rings can also be susceptible to the degrading effects of corrosion, particularly in seaborne applications. Moreover, the initial cost of slip rings can be relatively high.

In applications where the sensor is an active element that receives and/or transmits electrical signals and the sensor is mounted to the yoke, the signals need to be transferred between the rotating and non-rotating components of the hemispherical pointing device. Such signal transfer can be effectuated using RF rotary joints. The insertion of RF rotary joints in the signal paths, however, can introduce undesirable power losses in the signals.

SUMMARY OF THE INVENTION

Embodiments of the invention concern systems for positioning passive reflectors, such as lens/mirror assemblies, and other types of reflectors that need to be pointed in a particular direction. The systems effectuate control of both the elevation and azimuth angles of the reflector. The embodiments are configured so that a yoke can rotate so as to vary the azimuth angle of the reflector by 360° or more without a need to reverse the direction of rotation of the yoke, and without the use of slip rings, RF rotary joints, or electric cable (wrapping).

Embodiments of systems for positioning reflectors comprise a base and a yoke which is mounted on the base. The yoke is arranged to rotate about a first axis in relation to the base and is capable of supporting the reflector so that the reflector can rotate about a second axis in relation to the yoke. An azimuth control motor is advantageously used to drive the yoke for rotation around the first axis. The positioning system also includes a linkage comprising at least one connecting rod. The linkage is operable to rotate with the yoke about the first axis. The linkage is mechanically coupled to the reflector so that movement of the linkage in relation to the yoke imparts rotation to the reflector about the second axis when the reflector is supported by the yoke. The linkage is capable of being driven for movement in relation to the yoke by a component. For example, the component can be an elevation control motor. The arrangement is such that the component remains substantially stationary with respect to rotation about the first axis while the linkage and the yoke rotate about the first axis. Notably, the movement of the linkage varies responsive to a movement of the component in accordance with a relationship that is approximately linear.

According to another aspect, the invention concerns a system for positioning a reflector including a base, yoke and reflector as described above. An elevation control motor is mounted on the base so that the elevation control motor remains substantially stationary with respect to rotation about the first axis while the yoke rotates about the first axis. A connecting rod actuated for movement by the elevation control motor is mechanically coupled to the reflector so that movement of the connecting rod in relation to the yoke imparts rotation to the reflector about the second axis when the reflector is supported by the yoke. A mechanical drive system couples an output shaft of the elevation control motor to the connecting rod. The mechanical drive system is arranged so that it varies the angular position of the reflector in a near linear relationship with respect to the rotation of the output shaft.

According to another aspect, the invention concerns an antenna system. The antenna system includes a spar formed from a metallic or dielectric material. A reflector is disposed within the radome and an active element is mounted on the spar so that the active element radiates inwardly toward the reflector and/or receives radiant energy reflected from the reflector. The antenna system also includes a system for mounting the reflector. The system for mounting the reflector is comprised of a base and a yoke which is mounted on the base. The yoke is configured to rotate about a first axis in relation to the base and is capable of supporting the reflector so that the reflector is operable to rotate about a second axis in relation to the yoke. An elevation control motor is fixed to the base and a mechanical drive system is coupled to the output shaft of the motor. The mechanical drive system is arranged to cause the reflector to rotate about the second axis at a near-constant angular velocity responsive to a constant rotation of the output shaft.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".)

FIGS. 1-5 depict a system 100 for positioning reflectors such as passive reflectors. The system 100 is described herein in connection with a passive reflector in the form of a lens/mirror assembly 10 comprising a "constant-k" or uniform dielectric lens attached to a reflecting mirror, and which requires continuous 360° motion in azimuth and continuous tilting in elevation. This particular type of reflector is depicted for exemplary purposes only. The system 100 can be used to position other types of objects that require mechanical positioning on a moving basis, including but not limited to gradient index (Luneberg) lenses, flat mirrors, etc.

Figure 1:
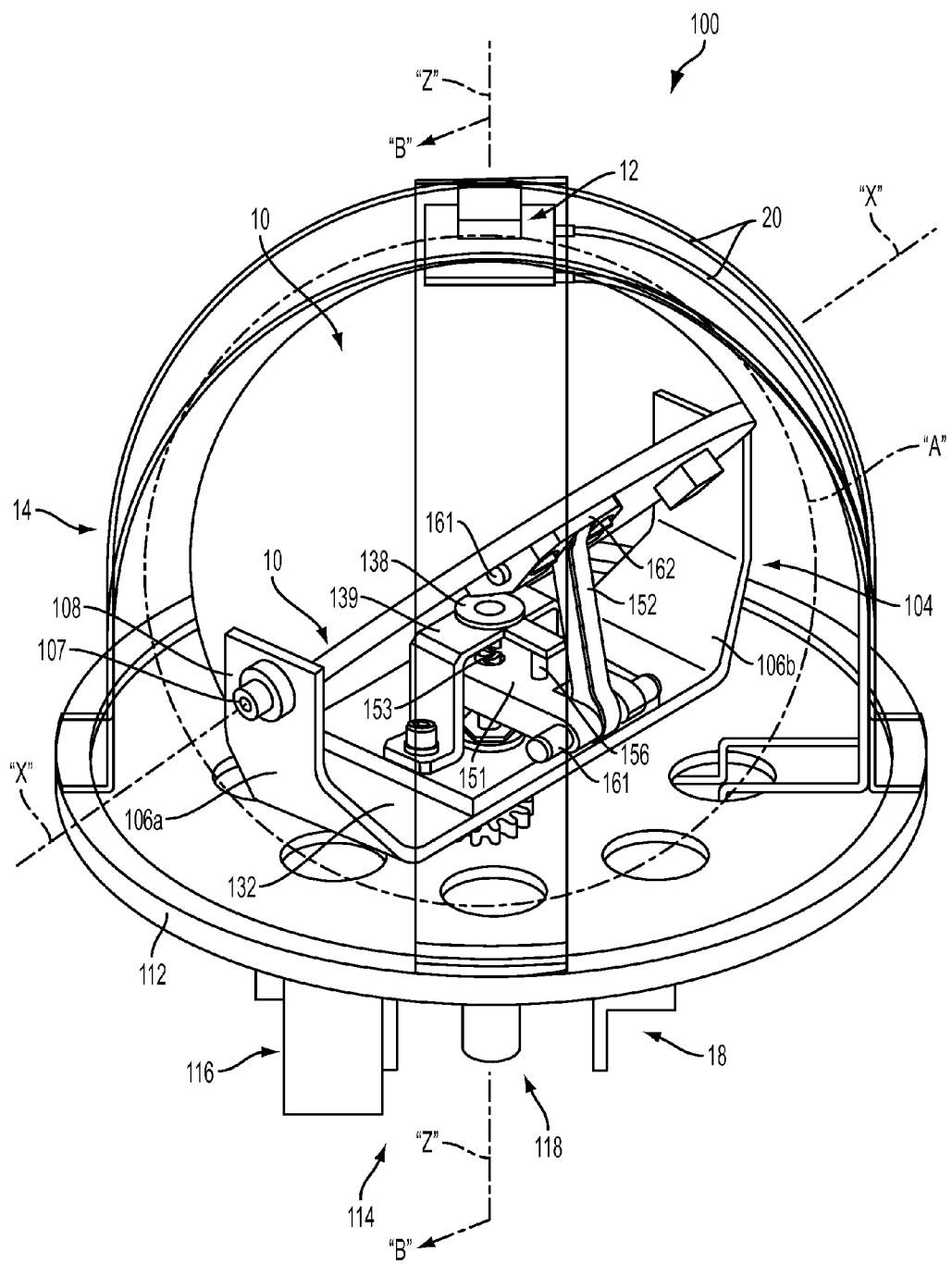
FIG. 1 is a perspective view of a system for positioning reflectors such as lens/mirror assemblies, depicting a radome associated with the system in partial phantom view.

The lens/mirror assembly 10 is part of an antenna system that also includes a feed 12. The lens/mirror assembly 10 and feed 12 together form a patch antenna. The lens/mirror assembly 10 is a passive element that focuses and directs radio frequency (RF) signals to and from the active feed 12. In particular, the lens of the lens/mirror assembly 10 enhances and organizes the electromagnetic energy being directed to or from the feed 12, and the mirror redirects the organized energy to its final position. The feed 12 is fixed to a spar in the form of a radome 14. The radome 14 covers the lens/mirror assembly 10 and parts of the system 100 as shown in FIG. 1. The feed 12 is positioned on the radome 14 in a center-uppermost or zenith position. The feed 12 radiates inwardly toward the lens/mirror assembly 10. The lens/mirror assembly 10 collimates the beam emitted by the feed 12, turns the beam outwardly, and points the beam in a desired direction.

The feed 12 can be communicatively coupled to an RF electronics module 18 that receives, generates, and processes the incoming and outgoing signals. The feed 12 and the module 18 can be communicatively coupled via cabling 20 secured to the surface of the radome 14. Since the lens/mirror assembly 10 is passive, and the active feed 12 is positioned on the radome 14, the system 100 does not require RF rotary joints or other means for transmitting electrical signals between rotating and non-rotating components thereof.

The use of the system 100 in connection with a patch antenna type feed 12 is disclosed for exemplary purposes only. The system 100 can be used in connection with other types of devices that require mechanical positioning or pointing of a reflective element, such as camera systems, lighting systems, lasers, and other types of antenna systems including but not limited to helix, dipole, and waveguide horn antenna systems. Moreover, the feed 12 can be mounted on metallic or dielectric spars other than the radome 14 in alternative embodiments.

The system 100 comprises a mount in the form of a yoke 104 having a first and second arm 106a, 106b. The lens/mirror assembly 10 is mounted to the yoke 104 via respective shoulder bolts 107 and bearings 108 positioned proximate the ends of first and second arms 106a, 106b, as shown in FIG. 1. The bearings 108 permit the lens/mirror assembly 10 to rotate or pivot in relation to the yoke 104, about a horizontally-oriented axis "x" denoted in FIG. 1.

The system 100 also includes a base 112. The base 112 can be mounted on a vehicle, airframe, ship, or structure on which the lens/mirror assembly 10 is to be used. The yoke 104 and the lens/mirror assembly 10 are positioned above the base 112, and can rotate in relation to the base 112 about a vertically-oriented axis denoted by the reference character "z" in FIG. 1.

The system 100 further includes a drive unit 114 mounted on an underside of the base 112, as shown in FIGS. 1 and 3. The drive unit 114 comprises a motor control unit 116. The drive unit 114 further comprises an azimuth control motor 118 and an elevation control motor 120 each communicatively coupled to and controlled by the motor control unit 116. The azimuth control motor 118 and the elevation control motor 120 are each capable of bi-directional i.e., forward and reverse, rotation. The azimuth control motor 118 and the elevation control motor 120 can be, for example, 12 or 24-volt direct-current micro-motors. Other types of motors can be used in the alternative. The azimuth control motor 118 can be equipped with an encoder 119, shown in FIG. 3, to track the azimuth angle of the lens/mirror assembly 10. The azimuth motor can also optionally include a gearbox 117. The elevation control motor 120 can be equipped with an encoder 122, to track the elevation angle of the lens/mirror assembly 10. The elevation control motor can also include an optional gearbox 115.

Figure 3A:
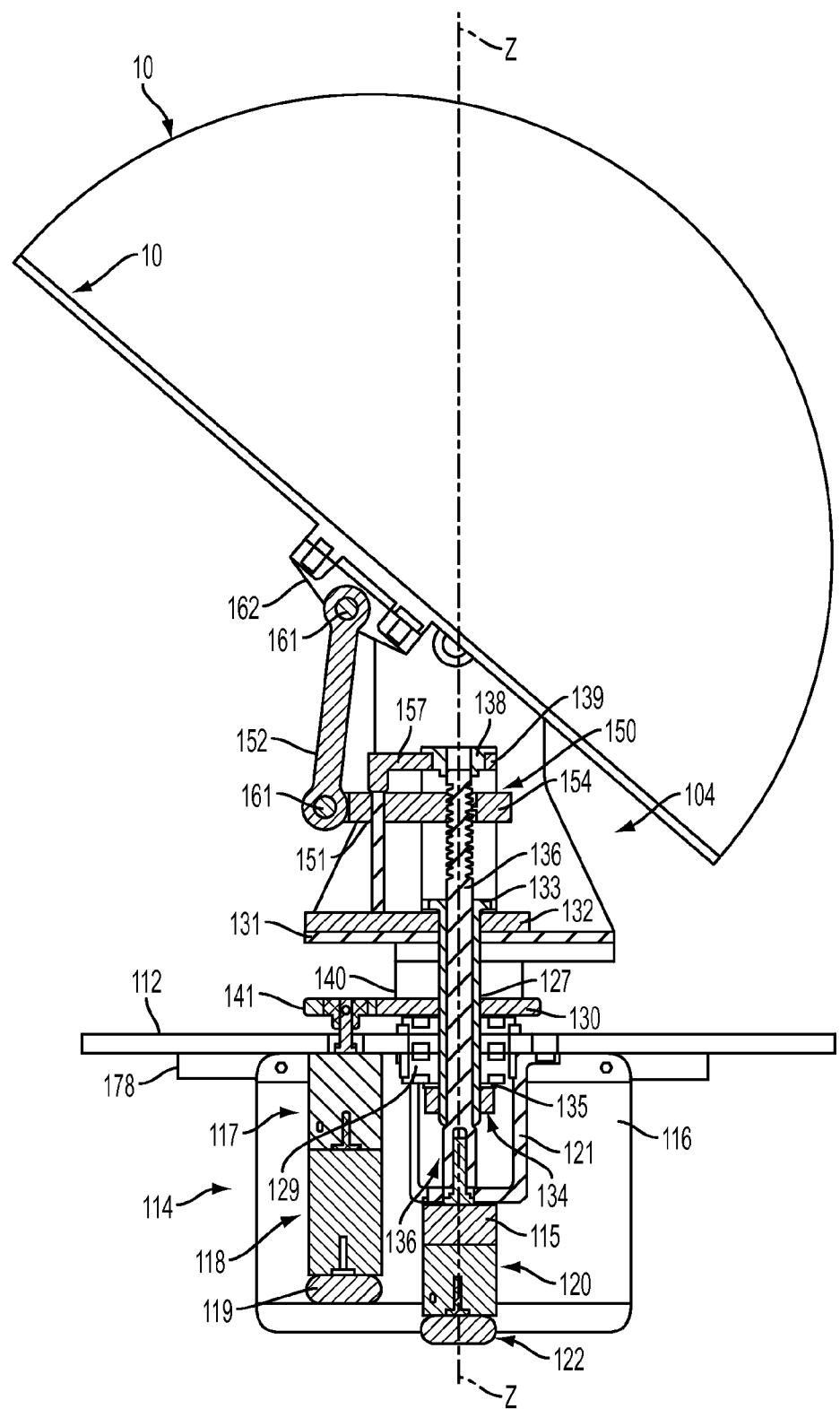
FIG. 3A is a cross-sectional view of the system shown in FIGS. 1 and 2, taken through the line "B-B" of FIG. 1.

The azimuth control motor 118 is offset from the center of the base 112 as shown in FIG. 3A. The azimuth control motor 118 can be suspended from the underside of the base 112 using bolts or other suitable means. The elevation control motor 120 is located directly below the center of the base 112, and can be suspended from a bracket 121, as shown in FIG. 3. The bracket 121 can be suspended from the base 112 using bolts or other suitable means.

The motor control unit 116 is mounted on a bracket 178. The bracket 178 can be suspended from the underside of the base 112 by means of bolts or other suitable means. The RF electronics module 18 (not shown in FIGS. 3A and 3B) can also be mounted to the base 112 or bracket 178.

Figure 8:
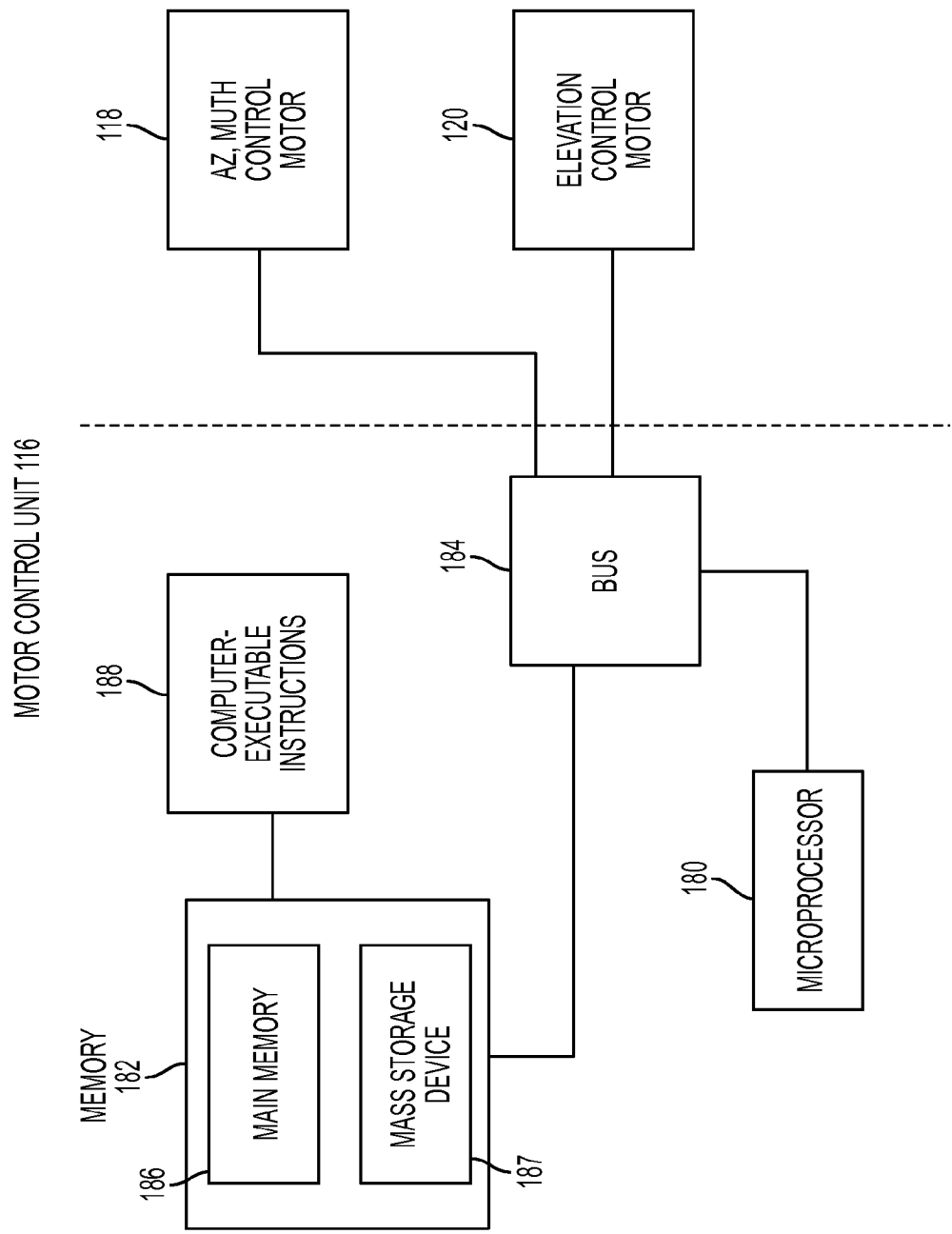
FIG. 8 is a block diagram that is useful for understanding a motor control unit which can be used with the present invention.

The motor control unit 116 includes a processor such as a microprocessor 180, a memory 182, and a bus 184, shown in FIG. 8. The bus 184 facilitates communication between the microprocessor 180 and the memory 182, the azimuth control motor 118, the elevation control motor 120, and other components of the system 100. The memory 182 can comprise a main memory 186 and a mass storage device 187, each of which is communicatively coupled to the microprocessor 180 by way of the bus 184. The main memory 186 can be, for example, random access memory. The mass storage device 187 can be, for example, a hard or optical disk.

The motor control unit 116 can also include computer-executable instructions 188 stored on the memory 182, as shown in FIG. 13. The computer-executable instructions 188, when executed on the microprocessor 180, cause the microprocessor 180 to generate control inputs for the azimuth control motor 118 and the elevation control motor 120. The control inputs cause the selective activation and deactivation of the azimuth control motor 118 and the elevation control motor 120 in a manner that controls the azimuth and elevation angles of the lens/mirror assembly 10, so as to properly position the lens/mirror assembly 10 for a particular operating condition.

Figure 3B:
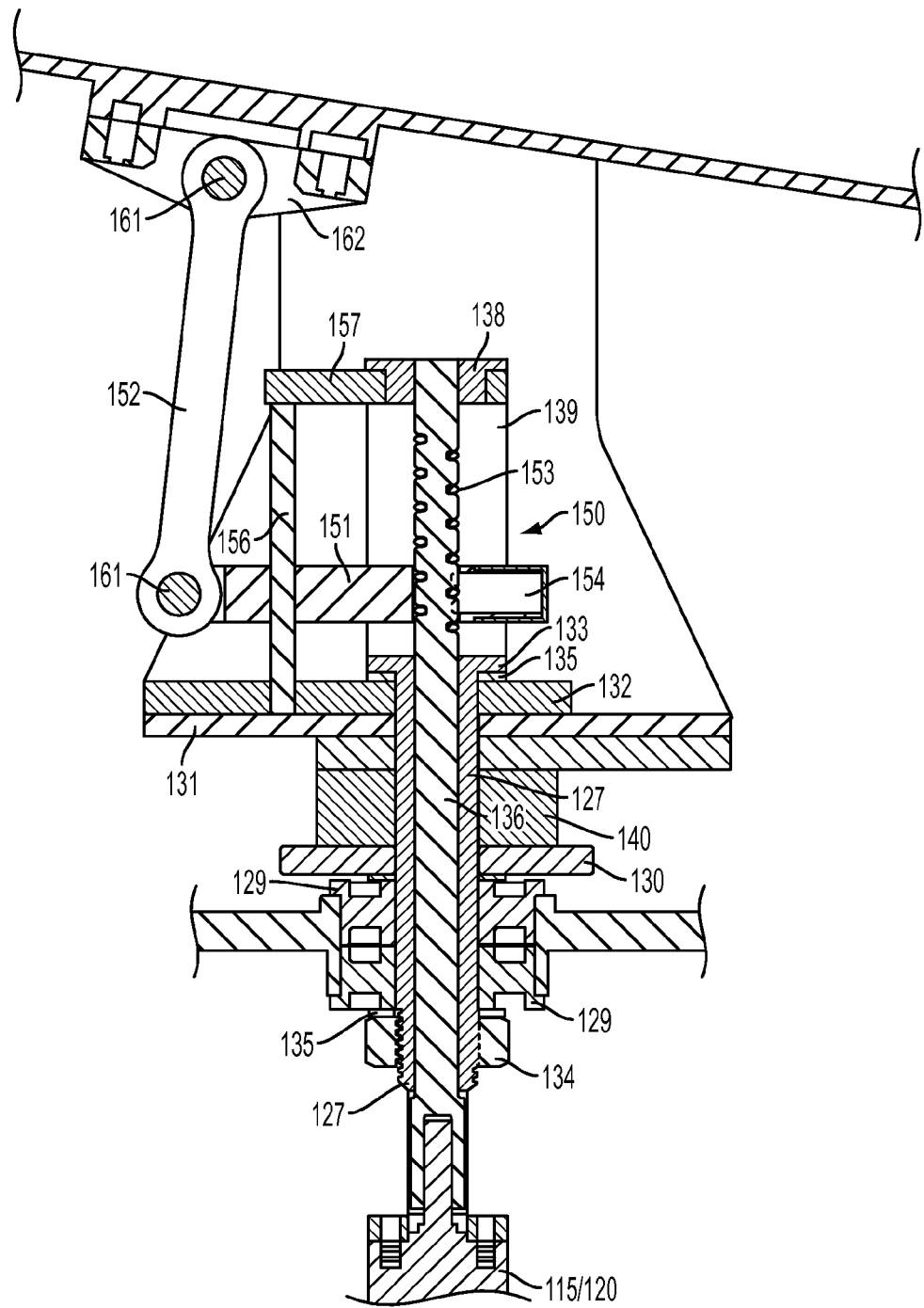
FIG. 3B shows a drive linkage portion of FIG. 3A which has been enlarged to show detail.

The yoke 104 is mounted for rotation on the base 12 by way of an attaching bolt 127, a ring-shaped spacer 140, bearings 129, a ring gear 130, washers 135, and a nut 134 as shown in FIGS. 3A and 3B. The bearings 129 are concentrically disposed around the outside diameter of the attaching bolt 127. The outer races of the bearings 129 can be secured in position to the base 112 by an interference fit or other suitable means.

The ring-shaped spacer 140 is concentrically disposed around the attaching bolt 127. The ring gear 130 is concentrically disposed around the middle portion of the attaching bolt 127. The ring-shaped spacer 140 can be positioned between the ring gear 130 and the underside of the center portion 131 of the yoke 104. If necessary, the ring gear 130 may be pinned together with the ring spacer 140 and yoke 104 to prevent rotation of the ring gear 130 with respect to the attaching bolt 127. The bearings 129 are located in a through hole formed at the center of the base 112. The outer race of the bearing 129 engages the base 112 along a periphery of the through hole as shown in FIGS. 3A and 3B, so that the bearing 129 is secured to the base 112 in the axial, i.e., vertical, direction.

The shaft of the attaching bolt 127 extends through a through hole formed in the center portion 131 of the yoke 104, and through a mounting plate 132 located on the center portion 131, as shown in FIG. 3B. The shaft of the attaching bolt 127 further extends through the inner races of bearings 129 which are assembled to the base 112.

A head 133 of the attaching bolt 127 rests on the mounting plate 132. The attaching bolt 127 is secured to the yoke 104 and the base through the use of a nut 134 and washer 135 as depicted in FIG. 3B. The nut 134 engages threads on the lower portion of the attaching bolt 127. Tightening of the nut 134 urges the washer 135 against the inner race of the lower bearing 129. This causes the head 133 of the attaching bolt 127 to be urged downward, into the mounting plate 132. The sandwiching of the center portion 131 of the yoke 104 between the nut 134 and the head 133 of the attaching bolt 127 allows the yoke 104 to rotate about the "z" axis with the bolt 127, the ring-shaped spacer 140, the ring gear 130, the washers 135, and the inner races of the bearings 129.

From the foregoing description it can be understood that there are two (2) washers 135 provided in the arrangement shown in FIG. 3B. One washer rides on the inner race of the lower bearing and the other washer rides on the inner race of the upper bearing. When the nut 134 is tightened on the bolt 127, the ring gear 130 presses on the washer 135 which presses on the inner race of the upper bearing 129. On the bottom side, the nut 134 presses on the washer 135 which in turn presses on the inner race of the lower bearing 129. Consequently, this design allows the yoke to be attached to the base, but still rotate freely with respect to the base.

The system 100 also includes a drive shaft 136. A portion of the drive shaft 136 is disposed concentrically within the attaching bolt 127, as shown in FIG. 3B. A bore is formed within the attaching bolt 127 to accommodate the drive shaft 136. The bore is sized so that a clearance exists between the drive shaft 136 and the attaching bolt 127, thereby facilitating rotation of the drive shaft 136 in relation to the attaching bolt 127.

Figure 2A:
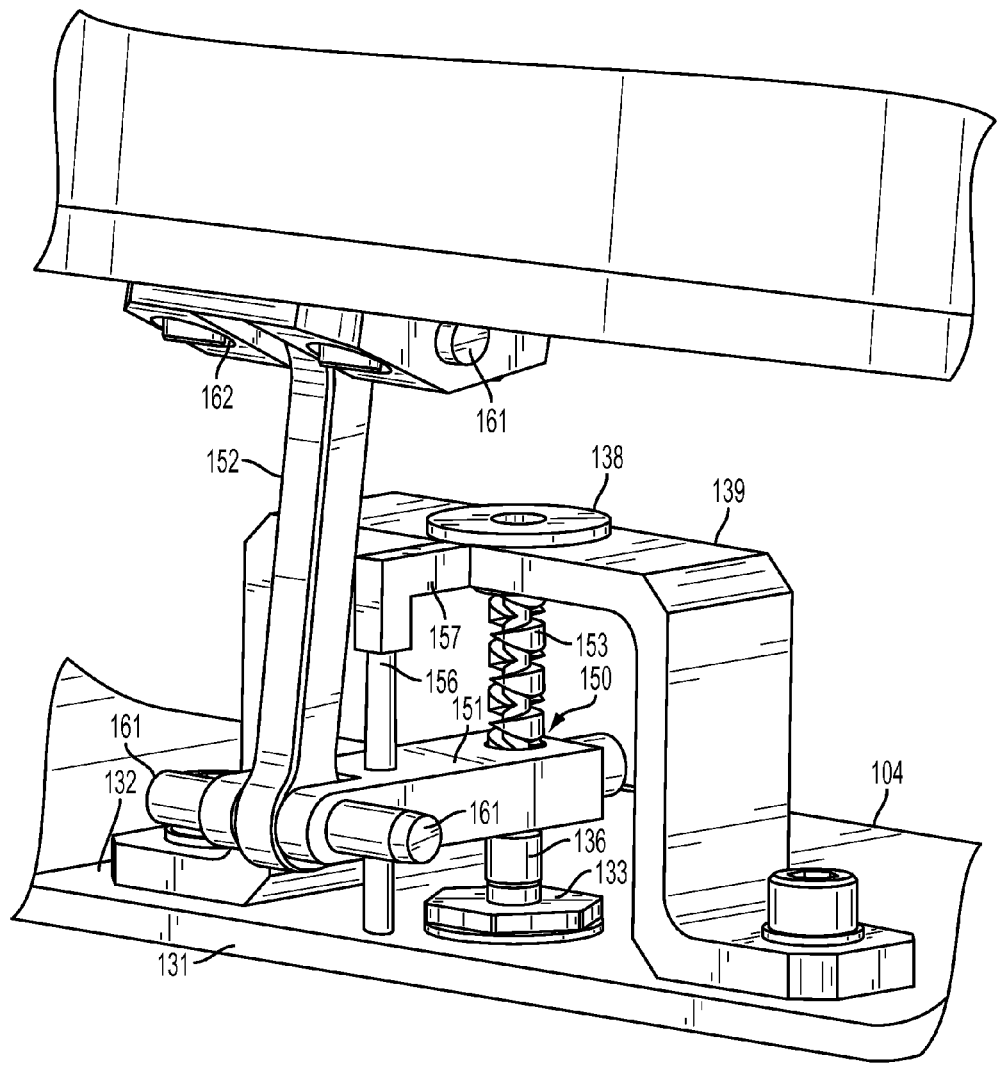
FIG. 2A is a first magnified view of the area designated "A" in FIG. 1.
Figure 2B:
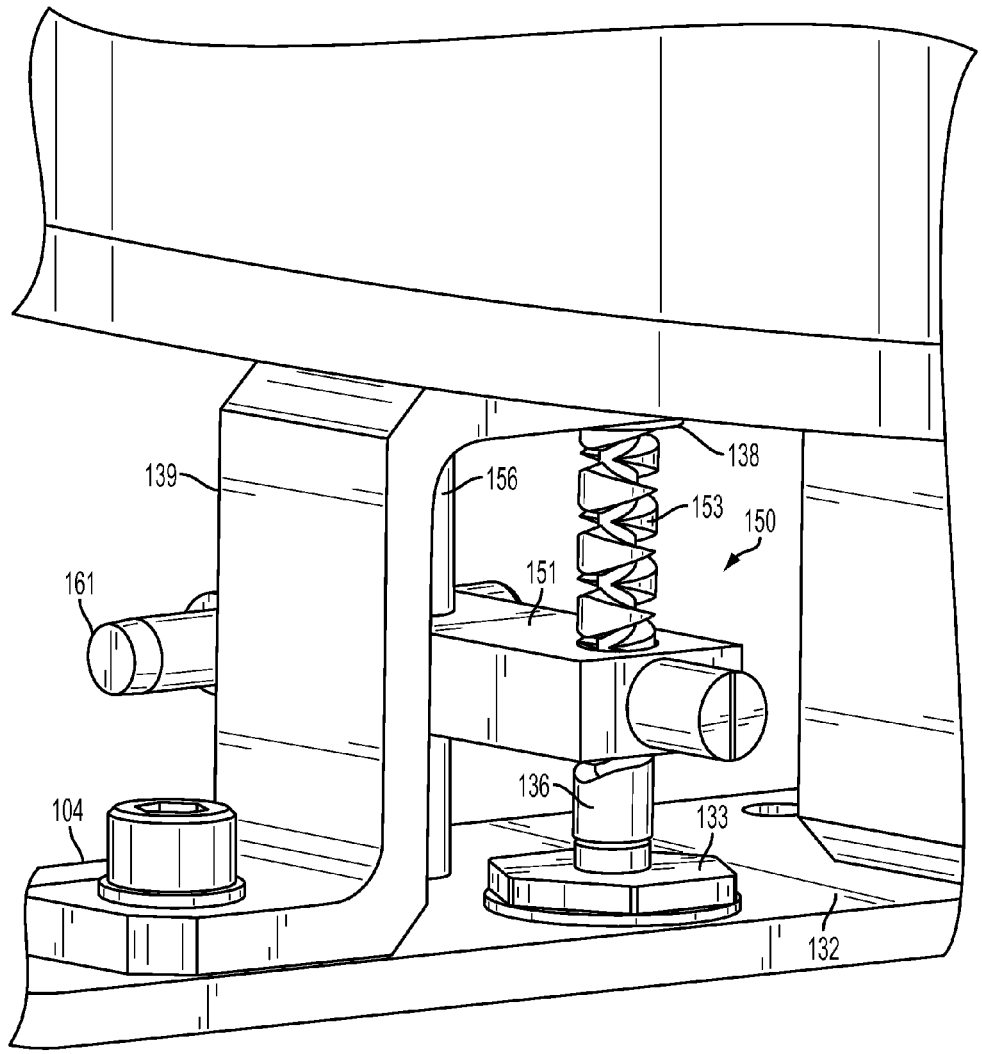
FIG. 2B is a second magnified view of the area designated "A" in FIG. 1.

The elevation control motor 120 (and optional gearbox 115) is mounted below the drive shaft 136 as shown in FIG. 3B, and is coupled to the drive shaft 136 so that activation of the elevation control motor 120 causes the drive shaft 136 to rotate. The term "coupled," as used herein, is intended to denote both direct and indirect connections between two or more parts or components. An upper end of the drive shaft 136 is laterally restrained by a flange bushing 138 mounted on a bracket 139. The bracket 139 is mounted on the mounting plate 132 on the center portion 131 of the yoke 104, as shown in FIGS. 1-3.

The azimuth control motor 118 is mechanically coupled to the ring gear 130 via a spur gear 141, shown in FIG. 3A. The shaft of the azimuth control motor 118 (or optional gearbox 117) extends through a through hole formed in the base 112. The shaft is mechanically coupled to the spur gear 141 so that the azimuth control motor 118, when activated, causes the spur gear 141 to rotate. When the spur gear 141 is rotated, it exerts a torque on the ring gear 130. Because the ring gear 130 is secured to the ring-shaped spacer 140 and yoke 104, the torque generated by the azimuth control motor 118 and exerted on the ring gear 130 is transferred to the yoke 104 and thereby causes the yoke 104 and the lens/mirror assembly 10 to rotate about the vertically-oriented "z" axis.

Thus, it can be seen that the torque generated by the azimuth control motor 118 causes the spur gear 141 to rotate, which in turn causes the ring gear 130 to rotate about the vertically-oriented "z" axis. The sandwiching of the ring gear 130 generated by the attaching bolt 127 and nut 134 causes the yoke 104 to rotate with the ring gear 130. Because the lens/mirror assembly 10 is mounted to the yoke 104, activation of the azimuth control motor causes the yoke 104 and the lens/mirror assembly 10 to rotate about the "z" axis. Rotation of the lens/mirror assembly 10 about the "z" axis varies the azimuth angle of the lens/mirror assembly 10. Thus, the azimuth angle of the lens/mirror assembly 10 can be controlled by selectively activating and deactivating the azimuth control motor 118 using inputs generated by the microprocessor 180 of the motor control unit 116.

The above details relating to the manner in which the yoke 104 is mounted and rotated are disclosed for exemplary purposes only. The yoke 104 can be mounted and rotated using other means in alternative embodiments. For example, drive belts can be used in lieu of the above-described gearing to drive the yoke 104 for rotation about the "z" axis.

As discussed below, the configuration of the system 100 obviates any need to supply electrical power between the base 112 and the components of the system 100, such as the yoke 104, that rotate in relation to the base 112. Thus, there is no need for cabling or slip rings to transfer electrical power between the rotating and non-rotating components of the system 100. This feature permits the yoke 104 and the lens/mirror assembly 10 to rotate continuously about the "z" axis, and thus permits the azimuth angle of the lens/mirror assembly 10 to be varied by 360° or more without having to reverse the direction of rotation of the lens/mirror assembly 10.

Figure 4:
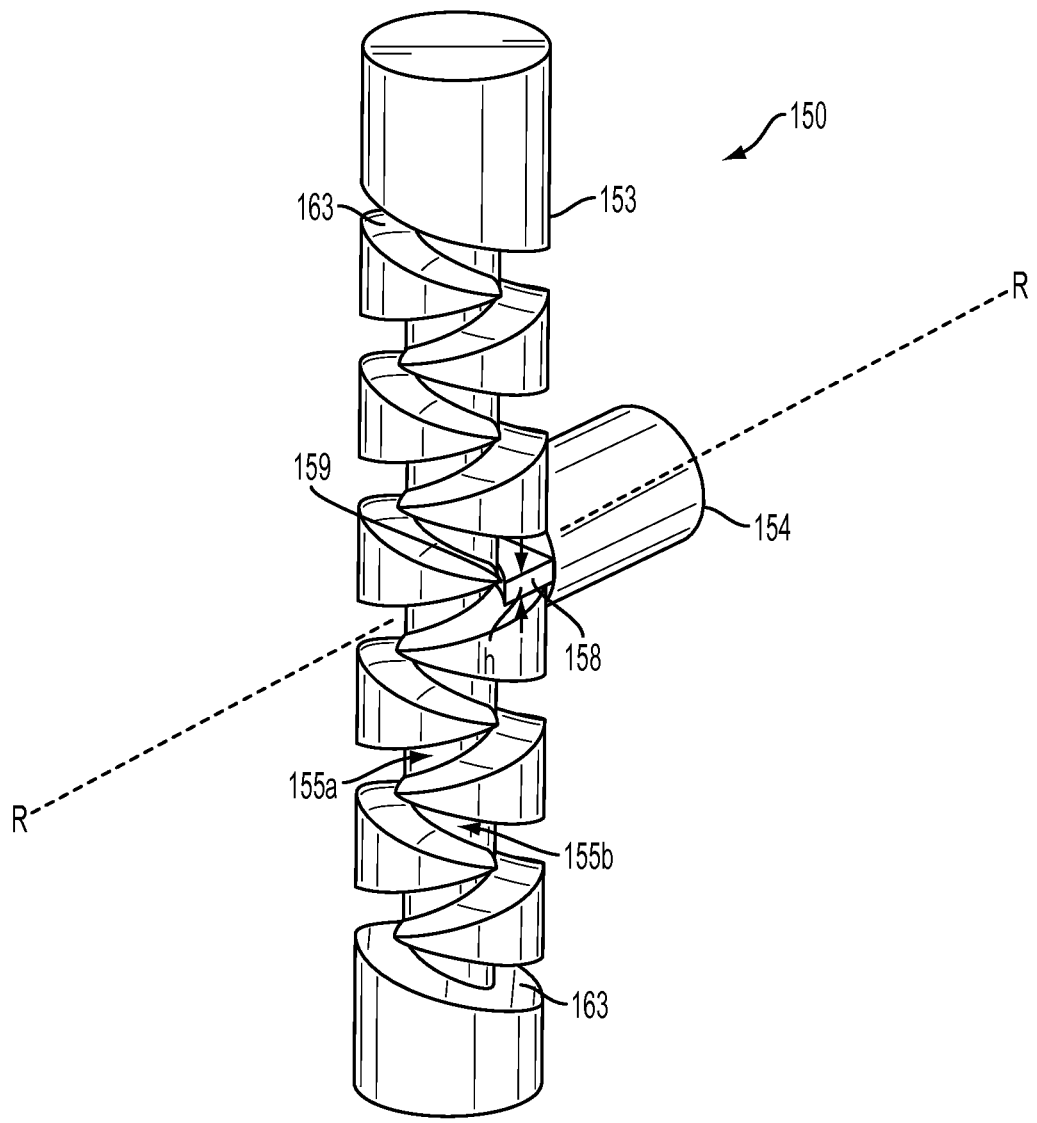
FIG. 4 is a perspective view showing an engagement of a pawl with the worm of the system shown in FIGS. 1-3.
Figure 5:
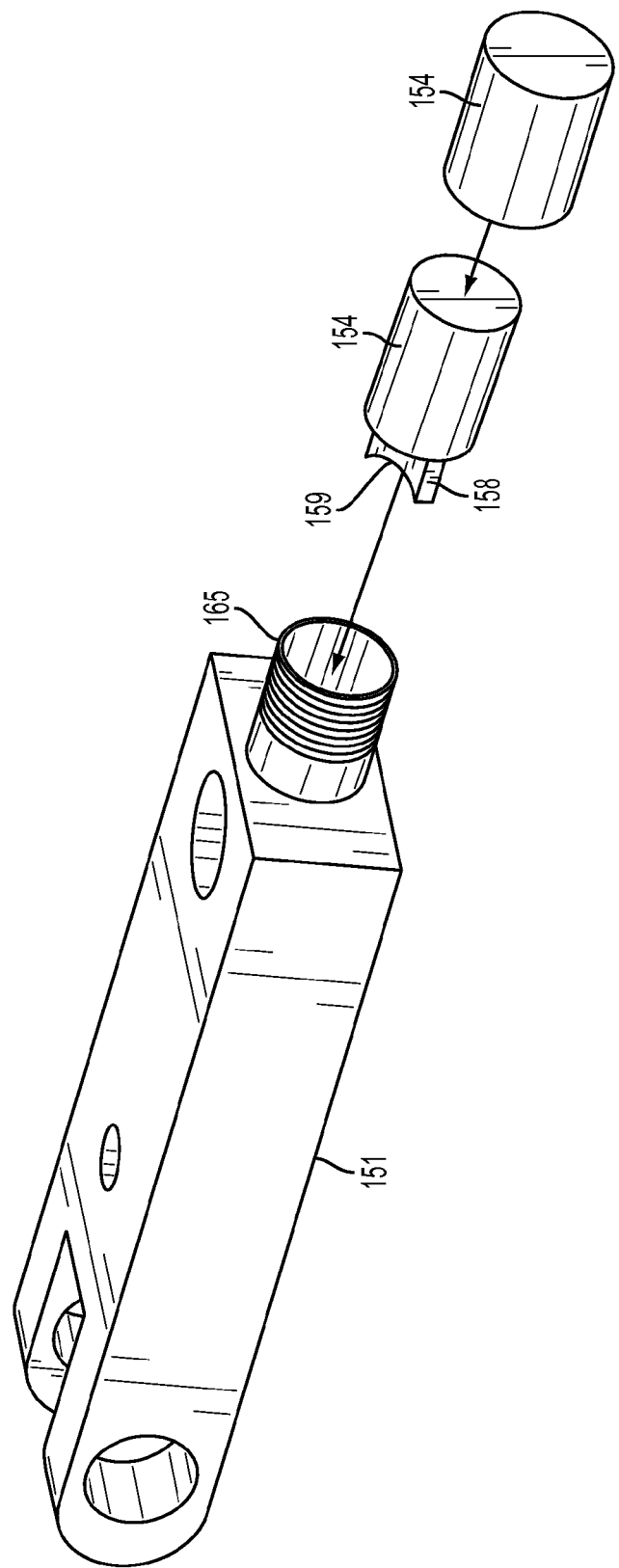
FIG. 5 is an exploded view of the push-pull link shown in the system of FIGS. 1-3, including the pawl and pawl cap.

The system 100 further includes a worm gear-set 150, a linkage in the form of a push/pull link 151 and a rigid connecting rod 152 for varying the elevation angle of the lens/mirror assembly 10. The push/pull link is depicted separately in FIG. 5. The gear-set 150 includes a screw or worm 153, shown in FIGS. 1-4, and a pawl 154 as shown in FIGS. 3-5. The worm 153 is securely mounted on an upper end of the drive shaft 136 by an interference fit or other suitable means, so that the worm 153 rotates with the drive shaft 136. In some embodiments, the worm can be integrally formed with the drive shaft.

The pawl 154 is rotatably mounted within the push/pull link 151. The pawl 154 engages the worm 153 and this engagement is depicted in further detail in FIG. 4. An exploded view which shows the rotatably mounting arrangement of the pawl within the push/pull link 151 is depicted in further detail in FIG. 5. The arrangement of the pawl 154 and worm 153 is such that when rotational motion imparted to the drive shaft 136, the gear-set 150 will cause push/pull link 151 to move in a direction aligned with the "z" axis, parallel to the elongated axial length of the worm 153. A guide bar 156 is inserted within a guide aperture formed on the push/pull link 151 as shown in FIGS. 2-3. The guide bar 156 is fixed in position at an upper end thereof by means of a support bracket 157. The guide bar 156 is secured at its lower end to the mounting plate 132. The guide bar 156 guides the push/pull link 151 along a vertical path aligned with the "z" axis, and prevents the push/pull link 151 from rotating in response to rotation of the worm 153. The drive shaft 136, worm 153, pawl 154, and the push-pull link 151 comprise a mechanical drive system which is capable of imparting movement to the connecting rod 152.

A first end of the connecting rod 152 is pivotally coupled to the push/pull link 151 via a shoulder pin 161 as shown in FIGS. 1-3, so that motion of the push/pull link 151 along a path aligned with the "z" axis will impart movement to the first end of the connecting rod 152. A second end of the connecting rod 152 is pivotally coupled to a flange 162 positioned on an underside of lens/mirror assembly 10, via another shoulder pin 161. The connecting rod 152 thus functions as a linkage that transmits the force exerted by push/pull link 151 on the connecting rod 152 to the lens/mirror assembly 10. This force, in combination with the restraining forces exerted on the lens/mirror assembly 10 by the yoke 104 via the bearings 108, cause the lens/mirror assembly 10 to rotate about the horizontal axis "x" in response to rotation of the worm 153.

Thus, it can be seen that the torque generated by the elevation control motor 120 causes the drive shaft 136 to rotate, which in turn rotates the worm 153. As a result of such rotation, the pawl 154 is caused to move in transverse helical grooves 155a, 155b formed on the surface of the worm 153. The movement of the pawl 154 is in a direction aligned with the "z" axis. The forces exerted upon the pawl 154 by the worm 153 will be imparted to push/pull link 151. These forces will cause the push/pull link 151 to move in a direction aligned with the "z" axis. This movement of the push/pull link 151 will in turn move connecting rod 152 in a manner that causes the lens/mirror assembly 10 to pivot or rotate about the horizontal "x" axis.

Rotation of the lens/mirror assembly 10 about the "x" axis varies the elevation angle of the lens/mirror assembly 10. Thus, the elevation angle of the lens/mirror assembly 10 can be controlled by selectively activating and deactivating the elevation control motor 120 using inputs generated by the microprocessor 180 of the motor control unit 116. The elevation angle of the lens/mirror assembly 10 can be varied by, for example, approximately 55°. This degree of variation, in combination with the azimuth-angle control, facilitates hemispherical coverage for the antenna beam.

The start and end points for the rotational motion of the lens/mirror assembly 10 about the horizontal "x" axis can be changed by, for example, varying the length of the connecting rod 152, and/or varying the location on the underside of lens/mirror assembly 10 at which the flange 162 is mounted. Moreover, the system 10 can be configured so that the start and end points can be adjusted after assembly. For example, a turnbuckle with left and right-hand threads can be incorporated into variants of the connecting rod 152 to alter the start and end points.

Because the elevation control motor 120 is mounted on the base 112, rather than on the yoke 104 or another component that rotates in relation to the base 112, there is no need to supply electrical power to the yoke 104 or other rotating components. This feature, as discussed above, permits the yoke 104 and the lens/mirror assembly 10 to rotate continuously about the "z" axis without the use of slip rings or other means for transferring electrical power between rotating and non-rotating components.

Due to the inherent mechanical characteristics of worm drives, the worm gear-set 150 cannot be back driven, i.e., the pawl 154 cannot cause the worm 153 to rotate. Thus, the loads on the lens/mirror assembly 10 do not need to be balanced about the axis of rotation "x," since unbalance about this axis will not cause back-drive of the worm 153, drive shaft 136, or elevation control motor 120, although balancing is recommended in applications where continuous high-speed rotation of the yoke 104 and the lens/mirror assembly 10 about the "z" axis is anticipated.

Moreover, as a result of the configuration of the system 100, the position of the lens/mirror assembly 10 will not be locked or frozen if the elevation drive motor 120 fails, i.e., the lens/mirror assembly 10 can still be rotated about vertical "z" axis following a failure of the elevation drive motor 120.

Moreover, the computer-executable instructions 188 of the motor control unit 116 can be configured so as to effectuate control of the elevation angle of the lens/mirror assembly 10 after a failure of the elevation control motor 120. In particular, the elevation angle of the lens/mirror assembly 10 can be varied without activating the elevation control motor 120, by rotating the yoke 104 about the "z" axis using the azimuth control motor 118. Rotating the yoke 104 while the elevation control motor 120 is inactive will cause the pawl 154 of the worm gear-set 150 to orbit about the worm 153, which will be stationary if the elevation drive motor 120 is inactive. The orbital motion of the pawl 154 about the worm 153 causes the worm 153 to urge the pawl 154 in a direction aligned with the "z" axis. Rotation of the pawl 154 imparts a force to the push/pull link 151 and the connecting rod 152, which in turn varies the elevation angle of the lens/mirror assembly 10. Thus, a desired elevation angle for the lens/mirror assembly 10 can be achieved by rotating the yoke 104 while the elevation control motor 120 is inactive and the worm 153 is stationary. The amount of rotation required to produce a desired elevation angle is dependent upon the difference between the actual and desired elevation angles. It may be necessary under some circumstances to rotate the yoke 104 through multiple revolutions to achieve the desired elevation angle.

The computer-executable instructions 188 of the motor control unit 116 can be configured to recognize a failure of the elevation control motor 120, and other circumstances that would prevent the control of the elevation angle through the use of the elevation control motor 120. The computer-executable instructions 188, in conjunction with the microprocessor 180, can effectuate elevation-angle control in a back-up mode under such circumstances, by generating control inputs that cause the azimuth control motor 118 to rotate the yoke 104 in the appropriate direction until the desired elevation angle is achieved.

Alternative embodiments of the system 10 can be configured without the elevation control motor 120 and the drive shaft 136. Control of the elevation angle of the lens/mirror assembly 10 can be effectuated solely by rotating the yoke 104 about the worm 153 or a similar structure, using the azimuth control motor 118 in the above-described manner. This embodiment can thus provide hemispherical pointing of the lens/mirror assembly 10 using a single motor.

Referring now to FIG. 4, it can be observed that the worm 153 is a double cut worm insofar as it has a pair of transverse helical grooves. The double helices are connected at opposing ends of the worm 153 by a transitional part 163 of the grooves having a suitably curved or straight contour. Pawl 154 has a generally cylindrical profile as shown. A tab 158 is formed at a tab end of the cylindrical pawl 154. The tab 158 has a flattened or planar profile as shown which extends transversely from an end portion of the cylindrical pawl 154. A height dimension "h" of the tab 158 is chosen so that the tab fits snugly between opposing sidewalls defining the grooves 155a, 155b. An end face 159 of tab 158 advantageously has a curved profile which is chosen to allow the end face to conform to curved contour defined by the groove of the worm 153.

As best understood from FIG. 5, the pawl 154 is mounted in the push-pull link 151 by inserting the tab 158 end of the pawl 154 within the hollow cylindrical guide member 165, so that the tab 158 will engage with one of the helical grooves 155a, 155b. A cap 154 is then threaded onto the end of the guide member 165 to retain the pawl 154 therein. The foregoing arrangement will provide a secure tabbed engagement of the push/pull link 151 and worm 153, but will allow the pawl 154 to rotate about its cylindrical axis R as it moves up and down along the length of the worm 153.

As will be understood from FIG. 4, the grooves 155a, 155b are cut so that rotation of the worm 153 in one direction will guide the pawl 154 along the length of a first helical groove in a first direction aligned with the "z" axis, after which continued rotation in the same direction will cause the pawl 154 to move through the transitional part 163 to then engage the second helical groove and begin traveling in an opposite direction which is also aligned with the "z" axis. The foregoing arrangement is advantageous insofar as it provides a near linear relationship between the rotation of the elevation drive motor 120 and the lens rotational position. The foregoing relationship will be best understood in relation to FIGS. 6 and 7.

Figure 6:
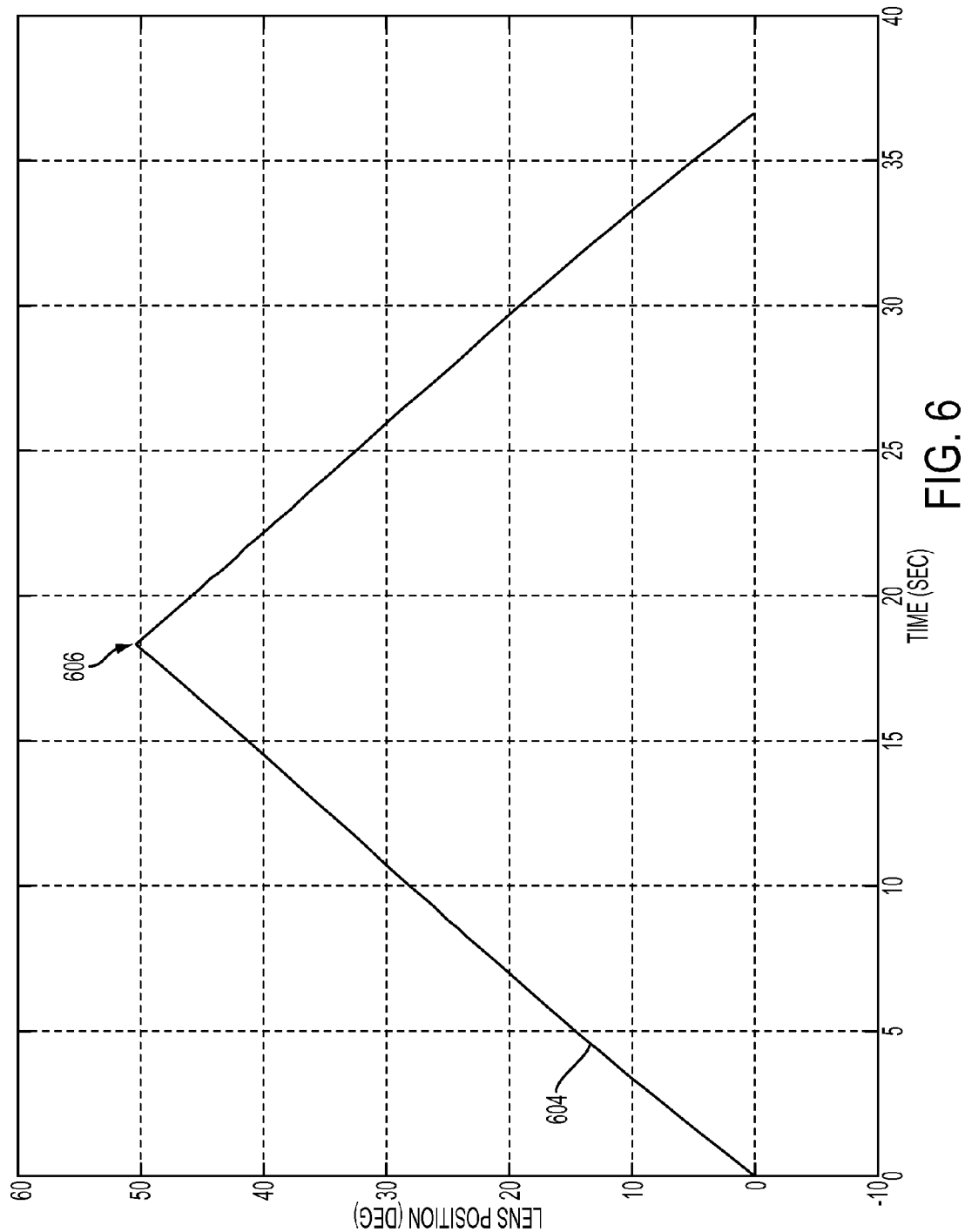
FIG. 6 is a plot which is useful for understanding a relationship between lens position in degrees versus time for the system in FIGS. 1-5.

FIG. 6 is a plot which shows angular lens position in degrees versus time for an elevation drive system utilizing a double-cut worm with pawl as described herein in relation to FIGS. 1-5. The plot 604 for the double-cut worm system shows a linear or near linear relationship between the time required to perform a complete cycle of the push/pull link 151 and the lens position. Of course, this relationship does not include variations which will occur at the transition point 606, which will naturally be non-linear. As used herein, the phrase "near linear" should be understood to mean that the lens rotation position versus time will deviate less than about 10% from linear when driven by a motor having a constant angular velocity. This linear or near linear relationship reduces the need for higher motor speeds because there are no portions of the lens rotational cycle during which significantly higher motor speeds are needed to maintain constant rotational velocity of the lens. Accordingly, the motor selection criteria are more relaxed because high rotational speed becomes less of a consideration.

Figure 7:
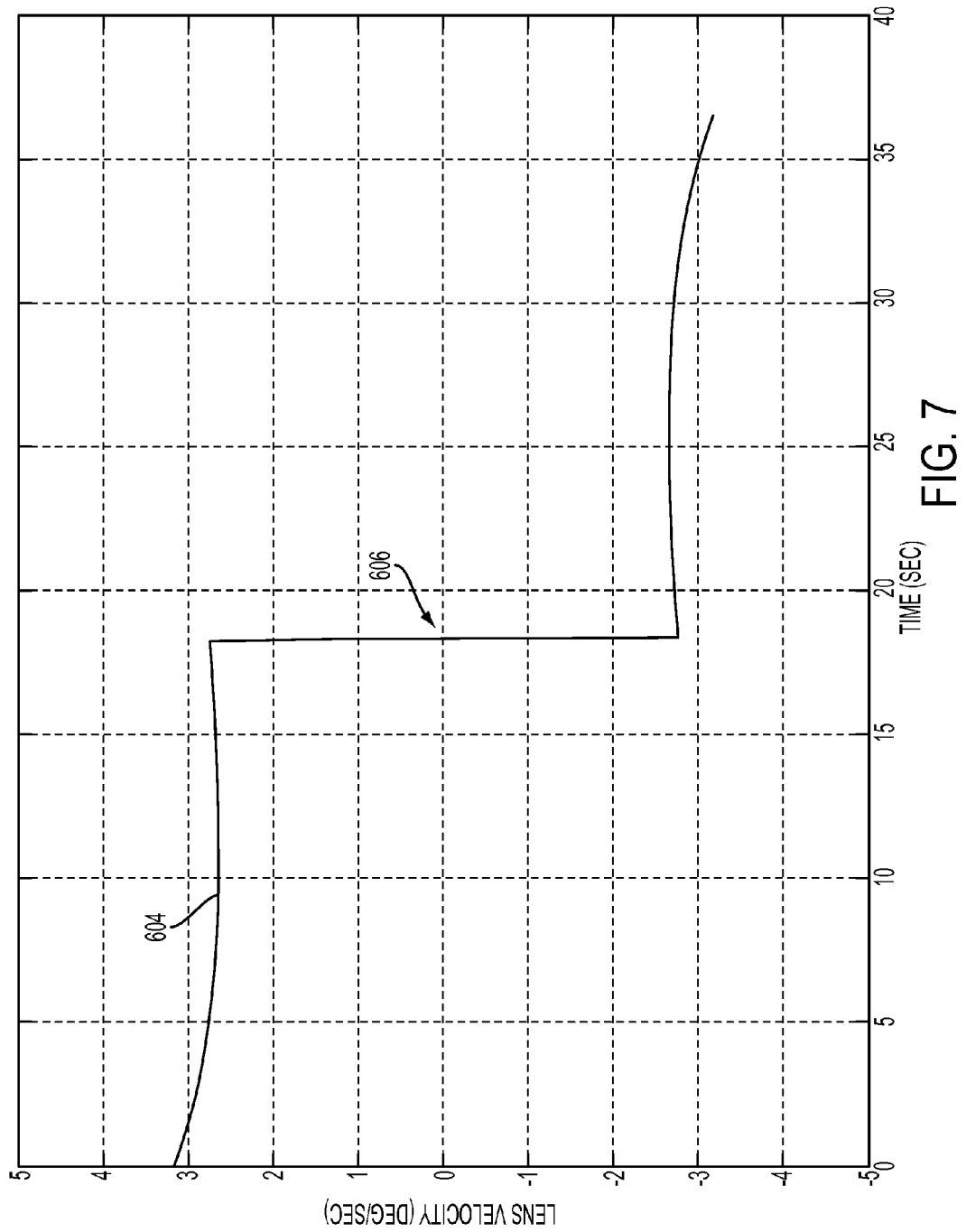
FIG. 7 is a plot that is useful for understanding a relationship between lens velocity and time for the system in FIGS. 1-5.

FIG. 7 shows a plot 704 of the lens velocity when the lens is driven by the double-cut worm as described in relation to FIG. 6. It can be observed that the velocity of the lens over time is of nearly constant magnitude throughout the entire angular range of movement. Further, when the lens passes through the transition point 606 (where the lens changes its direction of rotation), the change in rotation direction occurs almost instantaneously. The near vertical slope of plot 604 which exists at the transition point 606, evidences a very rapid change in velocity.

From the foregoing, it will be understood that the present invention includes a mechanical drive system which couples an output shaft of a drive motor 120 to the reflector. The mechanical drive system is arranged so that it varies an angular position of a reflector (e.g. a passive reflector in the form of a lens/mirror assembly 10) at a constant or nearly constant rate when driven by a motor output shaft which is rotated at a constant rate. Stated differently, the mechanical drive system is arranged so that it varies the angular position of the reflector in a nearly linear relationship with respect to the rotation of the output shaft. Consequently, angular velocity of the reflector is nearly constant in magnitude over time when the drive motor is operated at constant speed. This result is achieved by arranging the mechanical drive system so that push/pull link 151 (which forms a mechanical linkage between the reflector and the mechanical drive system) moves in a linear relationship to the rotation of the motor.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A system for positioning a reflector, comprising:
    a base;
    a yoke mounted on the base for rotation about a first axis in relation to the base and being capable of supporting the reflector so that the reflector can rotate about a second axis in relation to the yoke;
    a linkage comprising at least one connecting rod and at least one linkage member, wherein:
        the linkage is operable to rotate with the yoke about the first axis;
        the linkage member is limited to movement along a linear path parallel to the first axis; and
        the connecting rod having a first end mechanically coupled to the reflector offset a pre-defined distance from said first axis and a second end mechanically coupled to the linkage member so that the movement of the linkage member along the linear path imparts rotation to the reflector about the second axis when the reflector is supported by the yoke; and
    a feed positioned on a non-rotating component of said system.

2. The system of claim 1, further comprising an azimuth control motor mounted on the base and mechanically coupled to the yoke so that the azimuth control motor is operable to impart rotation to the yoke about the first axis.

3. The system of claim 2, wherein an elevation control motor drives the linkage member which causes movement in relation to the yoke.

4. The system of claim 2, further comprising a worm gear-set that is configured to drive the linkage member for movement in relation to the yoke, the worm gear-set comprising a worm, and a pawl that engages the worm so that relative movement between the worm and the pawl imparts translational movement to the pawl.

5. The system of claim 4, wherein:
    the reflector comprises a lens/mirror to which the first end of the connecting rod is mechanically coupled; and
    the linkage member is mechanically coupled to the pawl so that the translational movement of the pawl imparts movement to the linkage member in relation to the yoke.

6. The system of claim 5, further comprising an elevation control motor mounted on the base, and a drive shaft, wherein:
    the drive shaft is mechanically coupled to the elevation control motor so that the elevation control motor is operable to impart rotation to the drive shaft;
    the drive shaft is mechanically coupled to the worm so that rotation of the drive shaft imparts rotation to the worm;
    rotation of the worm imparts translational motion to the pawl of the worm-gear set; and
    wherein an elevation motor drives the linkage member which causes movement in relation to the yoke.

7. The system of claim 6, further comprising an attaching bolt and a gear concentrically disposed around the attaching bolt, said attaching bolt concentrically disposed around the drive shaft, and a contact bearing concentrically disposed around the attaching bolt, said contact bearing including an outer race that engages the base, wherein the attaching bolt is mechanically coupled to the yoke so that the yoke rotates about the first axis with the attaching bolt, and the gear is mechanically coupled to the azimuth control motor so that the azimuth control motor drives the yoke for rotation about the first axis by way of the gear and the bolt.

8. The system of claim 6, wherein the azimuth control motor and the elevation control motor are mounted on an underside of the base, opposed from said yoke.

9. The system of claim 1, further comprising at least one encoder configured to determine when one or both of an elevation angle and an azimuth angle of a lens has reached a reference position.

\* \* \* \* \*